(No Model.)
W. B. POTTER.
THREE WIRE ELECTRIC RAILWAY.
No. 548,389. Patented Oct. 22, 1895.
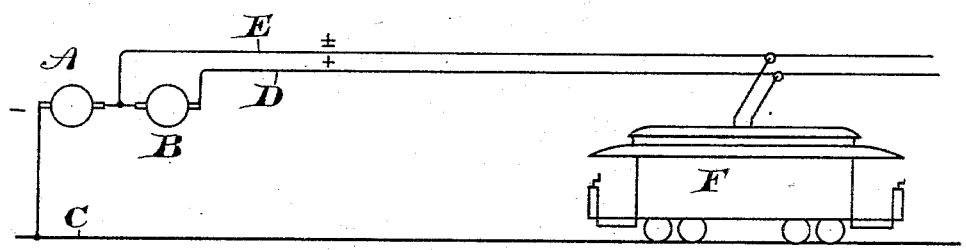
Witnesses.
A. F. Macdonald.
B. B. Hill.
Inventor.
William B. Potter,
by
Geo. R. Blodgett,
Atty.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

THREE-WIRE ELECTRIC RAILWAY.

SPECIFICATION forming part of Letters Patent No. 548,389, dated October 22, 1895.

Application filed August 8, 1895. Serial No. 558,600. (No model.)

*To all whom it may concern:*

Be it known that I, WILLIAM B. POTTER, a citizen of the United States, residing at Schenectady, in the county of Schenectady, State of New York, have invented certain new and useful Improvements in Three-Wire Electric Railways, (Case No. 263,) of which the following is a specification.

My invention relates to three-wire electric railways, and has for its object to provide a specific arrangement of conductors from which I derive advantages not heretofore obtainable with the ordinary arrangement of conductors in such roads.

As ordinarily constructed three-wire electric railways have two trolley-lines serving for the plus and minus conductors, and the rails or earth-return form the neutral of the system. In tramway-work where a single trolley is used the outgoing and return conductors are respectively at five hundred volts positive and negative potential and the neutral is at zero. In long-distance electric railroading it is sometimes desirable to use positive and negative conductors with two trolleys upon each car or locomotive, and in such cases the ground has been generally taken as the neutral. Such a system is described in my pending application, Serial No. 556,690, filed July 22, 1895, in conjunction with methods of motor-control which I have devised, peculiarly adapted to that system. The present system, however, differs from that. I have found that in such a system the conducting capacity of the neutral may be far greater than that of the feeders and lines of the positive and negative conductors. In the case of a double-track road having the standard steel-rail construction the conducting capacity of the rails is equivalent to five million circular mills of copper. The current flowing in the neutral is only that due at any time to want of balance in the system, as where the motor upon one side of the system should take a little more current than the one upon the other. As motors are ordinarily designed to be as nearly as possible alike in their construction, these small differences tend to balance up, so that practically but very little current will ever return to the station through the neutral. The very large carrying capacity of the track is thus wasted.

By the system which I have adopted and describe in this case I employ a track-return at zero potential, a positive conductor at a thousand volts difference of potential from the track, and a neutral intermediate conductor at five hundred volts above the track and below the positive conductor. This specific arrangement of conductors I believe to be new with me. By it I am enabled to use a very small conductor for the neutral, limited in size to that requisite to support the strain of its suspension, the ordinary trolley-wire being ample for this purpose, of No. 0 or No. 1 size. The wire might be even smaller if it were strong enough to stand the strain.

The accompanying drawing shows in diagram an exemplification of my invention.

A B are the dynamos connected in series, as in any ordinary three-wire system. C is the track, in this instance connected to the minus side of the system. D is the positive conductor, and E is the neutral. F is a car traveling upon the track and provided with trolleys, as in the application to which I have referred. All of these parts are in themselves old and well known, no special claim being made herein for any method or mode of control, though that in my application referred to is preferred.

The essence of my invention is in employing the track as one side of the system and two suspended conductors for the neutral and the other side; but in many cases, as in the case of elevated-railway work or in conduit construction, I may still employ the three-wire system, using the earth or ground return as one side of the system and having the neutral and the other side of the system composed of metal. Such an arrangement would be within the scope of my invention.

What I claim as new, and desire to secure by Letters Patent of the United States, is—

1. A three-wire electric railway system composed of two dynamos in series, a track or ground return forming one side of the system, and metallic conductors forming the neutral and the other side of the system.

2. A three-wire electric railway system comprising a source of electro-motive force, a positive conductor forming a trolley line and one side of the system, a neutral also forming a trolley line, and a track or ground return forming the negative or other side of the system.

3. A three-wire electric railway system comprising a divided source of electro-motive force, a track or ground return forming a negative at zero potential, a neutral conductor at five hundred volts positive potential, and a positive conductor at a thousand volts positive potential.

In witness whereof I have hereunto set my hand this 2d day of August, 1895.

WILLIAM B. POTTER.

Witnesses:
   A. F. MACDONALD,
   B. B. HULL.